3,519,367
AUXILIARY FAIRED SECTION FOR A
FLUID INLET
Jean Soulez-Lariviere, La Celle-St-Cloud, France, assignor to Nord-Aviation Societe National de Constructions Aeronautiques, Paris, France, a joint-stock company of France
Filed May 23, 1968, Ser. No. 731,449
Claims priority, application France, May 22, 1967,
107,475
Int. Cl. B64c 11/00
U.S. Cl. 415—185                               4 Claims

ABSTRACT OF THE DISCLOSURE

A propellor fairing assembly circumposed about a propellor and including a primary fairing element having an airfoil transverse cross section having a leading edge disposed in a plane generally upstream of the path of travel of said propellor, and an annular, auxiliary fairing element supported in circumposed relation within the primary fairing element and having a leading edge disposed upstream of a plane passing through the leading edge of the primary fairing element, said auxiliary fairing element having an airfoil transverse cross section, the cross section of said auxiliary fairing element diverging outwardly from the longitudinal axis of rotation of the propellor and having outer surfaces disposed in tangential relation to theoretical zones of maximum turbulence formed on the outer and inner surfaces of said primary fairing airfoil section, and the included angle defined by the tangents being less than 10° from their point of intersection downstream of said auxiliary fairing element.

---

The present invention relates to an auxiliary faired section for a fluid inlet and more particularly for a faired propellor comprising main and auxiliary faired sections.

A fluid inlet is an assembly of surfaces enabling a certain fluid flow to be collected, and the walls of this inlet essentially have a faired section suitable for this flow when the fluid is moving with respect to the section at a given speed. In fact, the flow conditions govern the geometry of the fluid inlet and the irregularity of this geometry which produces flow turbulence, or that which enables turbulence to be avoided, can be predicted. Turbulence occurs along the flow surface and causes energy losses in the total pressure of the fluid thus collected.

Moreover, when the respective speeds of the fluid to be collected and the collected fluid are known and are not variable, the solution to the problem is also known and it is sufficient, in order to avoid turbulence, to suitably shape the fairing of the flow surface.

Quite a different problem arises when the speed of the fluid to be collected can vary, since in this case it is absolutely necessary to modify the shape of the faired section, which indicates the use of variable geometry for solving the problem.

The present invention obviates the need for variable geometry at the fluid inlet, by providing an auxiliary faired section which adapts the fluid inlet to the different fluid flow speeds. The fixed auxiliary faired section is disposed at the inlet to a pipe, so as to replace a system of variable geometry rims.

For this purpose, the auxiliary faired section, which has a transverse section similar to that of an aeroplane wing, is located in a zone of the inlet in the vicinity of the main faired section, and its position is such that the angle of divergence of the directions of the fluid streams under extreme conditions includes to either side of the wing shaped section two angles of predetermined aerodynamic incidence. Thus, by locating this auxiliary faired section in the said zone and by fixing it once and for all at the mean angle which correctly divides the angle formed by the outer streams, the incidence of the said streams on the auxiliary faired section is such that turbulence on the main faired section is eliminated or at least considerably reduced.

The function of this auxiliary faired section is thus to relieve automatically the load on the main section by adapting the pressure exerted on the outer or inner surface, as the case may be, to the variable inlet conditions of the air streams, in order to avoid turbulence.

Other characteristics and advantages will appear from the description which follows with reference to the accompanying drawings of one embodiment of the invention, given by way of non-limitative example.

Figure 1:
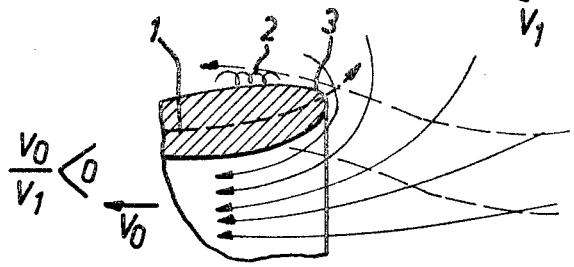
FIGS. 1, 2 and 3 are conventional schematic views in partial axial section of air streams in a fluid inlet for different ratios of speed of approach and speed over different sections.
Figure 2:
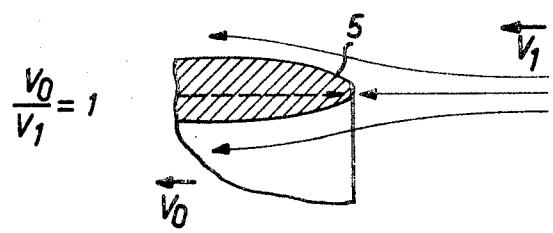
Figure 3:
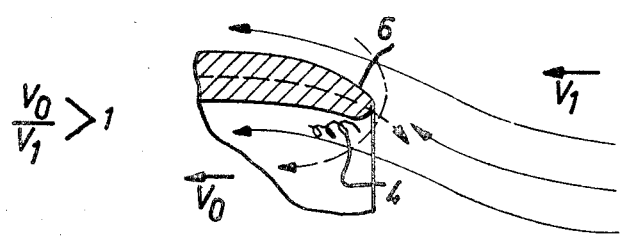
Figure 4:
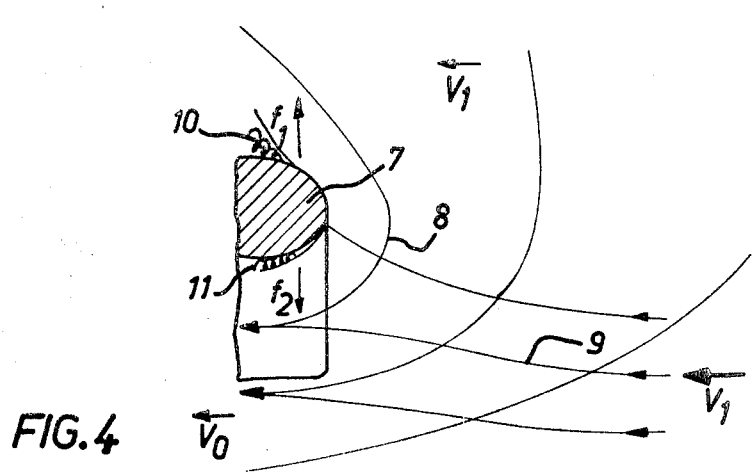
FIG. 4 is a similar diagram showing turbulence which occurs for the extreme flows over a symmetrical section.

It will be seen from FIG. 1 that when air streams move with respect to a section 1 under conditions such that the speed $V_0$ over the surface is less than the speed of approach $V_1$, turbulence occurs at 2 on the outer surface behind the rim 3. If $V_1=V_0$, and if the section 5 has a mean section which is rectilinear, the perfect flow of FIG. 2 is produced. In FIG. 3 where $V_0>V_1$, turbulence occurs at 4.

The conventional way of avoiding such turbulence consists in suitably deforming the section 1 in such a way that it assumes, as a function of the flow configuration considered, one or other of the geometries 3, 5 or 6 shown in FIGS. 1 to 3. It is also known, however, that such a variable geometry is necessarily complex and also difficult to obtain in certain conditions such as those involved in aeronautical applications, for example.

If a mean rim section 7 is adopted in varied actual aerodynamic conditions at any fluid input, it is seen that for the extreme configurations 8 and 9 of the speed of this fluid turbulences 10 or 11 will appear and the surface of the section will be loaded as shown at $f_1$ for $V_0<V_1$ (conditions of FIG. 1) or as shown at $f_2$ (conditions of FIG. 3).

A conventional faired propellor 12 is normally subjected to these unfavourable conditions when, as a result of circumstances prevailing during flight, one or other of the extreme configurations or an intermediate configuration is produced.

In accordance with the invention, there is located, upstream of the fluid inlet, an auxiliary faired section 20 whose main axis $x$–$x'$ bisects the angle between the directions AB and AC of the tangents to the extreme streams 8' and 9'.

The position of the point A with respect to the main fairing 13, the geometry $\gamma$ of the faired section 20 and the angles of incidence $\alpha_1$ and $\alpha_2$ are chosen in such a manner that the depressed zones at 14 for example or at 15 relieve the overpressures $f_1$ or $f_2$ which act on the main section.

Figure 5:
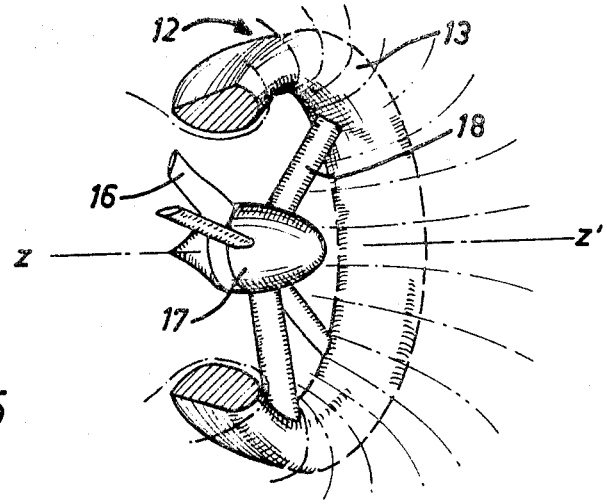
FIG. 5 is a perspective view of a conventional faired propellor.

As seen in FIG. 5, a conventional faired propellor assembly is illustrated generally at 12 and comprises a propellor 16 rotatable about axis z–z'. The assembly includes a domed boss 17 integrally supported by radial arms 18 integrally connected to an annular fairing element 13 having an airfoil transverse cross section.

Figure 7:
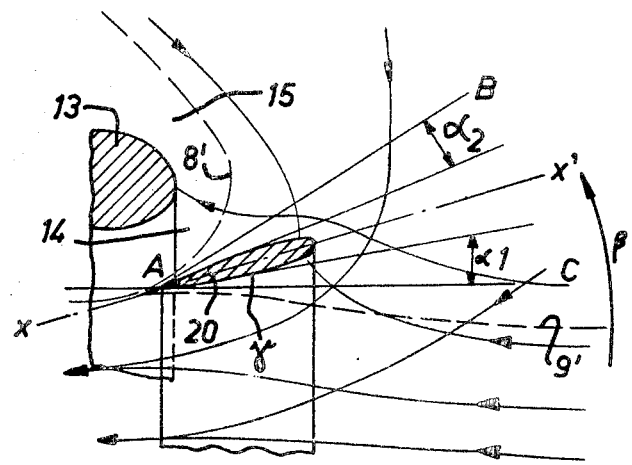
FIG. 7 is a partial axial section along the line VII—VII of FIG. 6 with a flow diagram corresponding to that of FIG. 4.

As seen in FIG. 7, the theoretical zones of maximum turbulence are indicated at 8' and 9' and these zones of maximum turbulence intersect at a point A which coincides with the downstream of trailing edge of the auxiliary fairing element airfoil profile or transverse cross section.

The auxiliary airfoil includes a principal axis defined at x–x' and bisects planes originating from point A. Tangent to the theoretical maximum turbulent zones 8' and 9' are planes A, B and A, C shown on FIG. 7.

Figure 6:
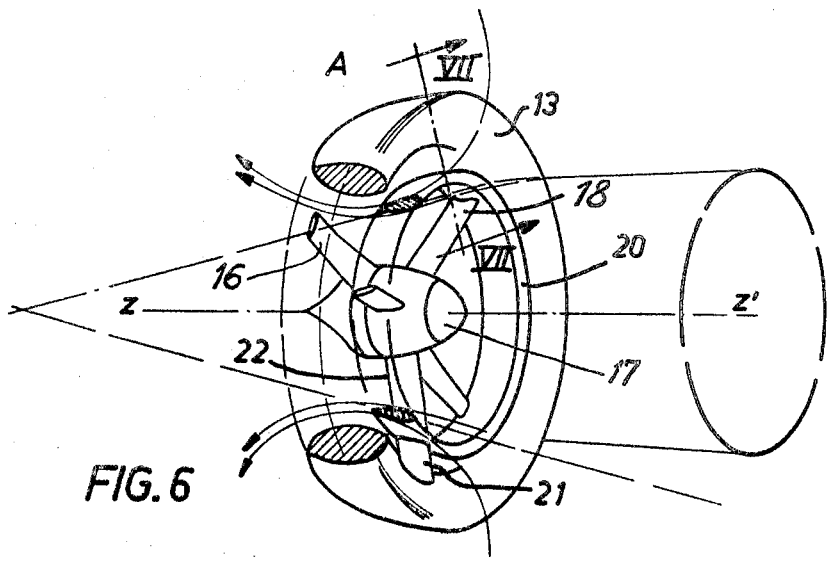
FIG. 6 is a similar view to FIG. 5 of a faired propellor but including an auxiliary faired section according to the invention.

Referring to FIGS. 5 and 6, it will be noted that the conventional structure of FIG. 5 is also shown in FIG. 6. Supplementing the structure of FIG. 5, and in combination therewith, is an auxiliary fairing element 20 supported in fixed relation to the primary fairing element at 13 and by radial arms 21.

The fairing elements of FIGS. 6 and 7 have the aerodynamic characteristics heretofore mentioned, to substantially eliminate or cure the turbulence problems mentioned with respect to FIGS. 1–4 in the specification and illustrated diagrammatically thereon.

The auxiliary fairing element is so constructed in design so as to cure and/or eliminate fairing turbulence for the extreme air speed ratios $V_0/V_1$ by utilizing the theoretical parameters mentioned relative to and illustrated in FIG. 7.

The angles of incidence $\alpha_1$ and $\alpha_2$ do not in principle exceed 10°.

Clearly the present invention has been described above purely by way of non-limitative explanation and any modifications of detail can be made thereto without exceeding its scope.

In particular, it will be seen that since the auxiliary faired section acts as a faired body disposed in a flow to modify the path thereof, all the known techniques for producing sucking or blowing of the outer layer against the surface of the auxiliary section fall within the scope of the invention as mere adaptations and modifications of detail.

What is claimed is:

1. A fairing assembly in combination with a propellor (16) supported on an axis of rotation (z–z') in which said propellor defines a plane-of-rotation normal to said axis of rotation,
   said fairing assembly comprising an annular, primary fairing element (13) having an airfoil transverse cross section (FIGS. 6, 7) circumposed about and generally surrounding the plane-of-rotation of said propellor (16),
   said transverse airfoil cross section having a generally leading semi-circular forward edge tapering to a generally feathered trailing edge and being conformed to develop maximum theoretical turbulence zones (8', 9') intersecting in a plane (A),
   the improvement comprising:
   an auxiliary annular fairing element (20) having an airfoil transverse cross section (FIG. 7) supported in fixed relation relative to said primary fairing element and generally circumposed within the primary fairing element,
      said auxiliary airfoil cross section having a leading, generally semi-circular edge tapering to a generally feathered trailing edge,
      said trailing edge of the auxiliary airfoil section coinciding in a plane at the intersection of the maximum theoretical turbulence zones (A).

2. The structure as claimed in claim 1 in which the auxiliary fairing element comprises a truncated annulus converging rearwardly,
   the maximum theoretical turbulence zones (8', 9') intersecting in said plane (A) disposed within a plane defined between the leading and trailing edges of said primary fairing element,
   the leading edge of said auxiliary fairing element being disposed axially forwardly beyond the leading edge of the primary fairing element.

3. The structure as claimed in claim 1 in which the included angle between an axial plane extending from the plane of intersection of said maximum theoretical turbulence zones and tangent to the outer surfaces of said auxiliary fairing element is less than 10°.

4. The structure as claimed in claim 1 including an axial, dome-shaped boss converging axially from the plane of rotation of said propellor and including radial support means integral therewith and fixed to said auxiliary fairing element, and radial support means extending from said auxiliary fairing element to said primary fairing element whereby said fairing elements and boss are fixed relative to each other.

References Cited

UNITED STATES PATENTS

| | | | |
|---|---|---|---|
| 2,330,907 | 10/1943 | Odor et al. | 415—185 |
| 3,029,045 | 4/1962 | Bertin et al. | |
| 3,320,702 | 1/1966 | Soulez-Lariviere et al. | |

EVERETTE A. POWELL, Jr., Primary Examiner

U.S. Cl. X.R.

416—189

UNITED STATES PATENT OFFICE

CERTIFICATE OF CORRECTION

Patent No. 3,519,367  Dated: July 7, 1970

It is certified that error appears in the above-identified patent and that said Letters Patent are hereby corrected as shown below:

In column 1, lines 2 and 3, the name of the assignee should read as follows:

Nord-Aviation Societe Nationale de Constructions Aeronautiques.

OCT 27 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,519,367              Dated  July 7, 1970

Inventor(s)  Jean SOULEZ-LARIVIERE

It is certified that error appears in the above-identified patent and that said Letters Patent are hereby corrected as shown below:

In the heading of the above U. S. patent, line 5 thereof should read: Claims priority, application France, May 23, 1967,

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents